United States Patent [19]

Ikeda

[11] Patent Number: 4,658,642
[45] Date of Patent: Apr. 21, 1987

[54] METHOD AND APPARATUS FOR DETECTING THE IGNITION TIMING FOR A DIESEL ENGINE

[75] Inventor: Shinji Ikeda, Susono, Japan

[73] Assignee: Toyota Jidosha Kabushiki Kaisha, Toyota, Japan

[21] Appl. No.: 606,969

[22] Filed: May 4, 1984

[30] Foreign Application Priority Data

May 7, 1983 [JP]  Japan ................... 58-79593

[51] Int. Cl.[4] ........................... G01M 15/00
[52] U.S. Cl. .................. 73/119 A; 123/494; 324/392
[58] Field of Search .......... 73/119 A, 117.3; 364/569; 324/392; 123/494

[56]  References Cited

U.S. PATENT DOCUMENTS

| 3,939,397 | 2/1976 | Maisonville | 324/392 |
| 4,231,091 | 10/1980 | Motz | 364/569 |
| 4,373,384 | 2/1983 | Olson et al. | 73/119 A |
| 4,441,360 | 4/1984 | Dooley et al. | 324/392 X |
| 4,463,729 | 8/1984 | Bullis et al. | 73/117.3 X |
| 4,469,952 | 9/1984 | Olson et al. | 324/392 X |
| 4,492,114 | 1/1985 | Yamanaka et al. | 73/117.3 |

FOREIGN PATENT DOCUMENTS

1187384  2/1965  Fed. Rep. of Germany .

Primary Examiner—Jerry W. Myracle
Attorney, Agent, or Firm—Finnegan, Henderson, Farabow, Garrett & Dunner

[57] ABSTRACT

A method for detecting the ignition timing for an engine comprising the steps of detecting the production in a crank angle range outside of the range where ignition can occur of a crank angle signal by a crank angle sensor at a first time point, detecting an ignition signal corresponding to the burning flame within the combustion chamber of the engine at the second time point, calculating the time difference $T_o$ between the first and second time points, and seeking a crank angle displacement from the production of the crank angle signal to the ignition signal detected by the equation of $T_o/CSC \times 360$, where CSC indicates a time interval between the crank angle signals and its apparatus. According to the present invention, even when the peak of the combustion light or the burning flame is detected twice for one combustion stroke, an accurate ignition timing can be detected by the detection of the first peak of the combustion light.

10 Claims, 16 Drawing Figures

METHOD AND APPARATUS FOR DETECTING THE IGNITION TIMING FOR A DIESEL ENGINE

BACKGROUND OF THE INVENTION (1) Field of the Invention

The present invention relates to method and apparatus for detecting the ignition timing for a Diesel engine, and more particularly, to a method for detecting the ignition timing of the Diesel engine and an apparatus for detecting the ignition timing of the Diesel engine from the output signal from a combustion light or burning flame sensor provided within the combustion chamber of the Diesel engine.

(2) Description of the Prior Art

In the field of art concerning the Diesel engines, there have been proposed some systems for detecting the start of ignition of the engine and for controlling the fuel injection timing and fuel injection amount. One of the systems is such that the ignition timing of the Diesel engine is detected by detecting a burning flame of the engine and the fuel injection timing and amount are controlled by utilizing the result of the detection. In such system, an ignition signal is produced from the light radiated from the burning flame of the engine and the time when the ignition signal is produced is determined as follows.

Namely, a crank angle signal which is periodically produced at a predetermined crank angle position, for example, a crank angle signal producing at every crank angle of 1°, is frequency-multiplied to produce a pulse signal which develops at each angle of 0.1°, and a time interval from a predetermined reference position until the ignition signal produced, is detected and measured by counting the pulse signals.

However, such system mentioned above requires (1) a crank angle sensor for detecting and producing a crank angle signal developed at every crank angle of, for example, 1° and (2) a signal processing circuit for dividing the frequency of the signal from the crank angle sensor; therefore, complicated sensor and signal processing circuit are required, which leads to increased manufacturing costs for such a device for realizing the system.

On the other hand, with respect to an apparatus for detecting the ignition of the fuel injected, a feedback technique is utilized which precisely controls the fuel injection timing and fuel injection rate or amount in accordance with the fuel ignition state, in which a flame sensor for detecting the ignition state of the fuel is used. Normally, the flame sensor has a cylindrical housing within which a light guide made of a heat-resistant, light-transmissive material such as quartz glass is fitted to. The light guide has a detection end which is slightly projected out of the cylindrical housing, the detail of which will be described later.

The combustion light or the burning flame detected by the flame sensor is led out of the combustion chamber and converted into an electrical signal by photoelectric converting means such as photodiodes, phototransistors or solar cells. However, the fuel is not necessarily combusted at a time point after the ignition is started and there is a case that one injection of the fuel is followed by two combustion strokes, or one combustion stroke provides two combustion light or burning flame detection signals. As a result, the control of fuel injection timing and amount could not be precisely done in accordance with the detection signals, in the technique according to the prior art.

To overcome such problems, it has been proposed to read the time interval from one signal to another when plural signals are supplied as input and to interpret plural signals as one signal if the time interval between such plural signals is judged to be within a predetermined value. Another method has also been disclosed in which combustion flame detection signals for such plural combustion strokes are cancelled. In the former case, however, the time interval between detection signals which may be taken as one signal varies with the change of engine speed, with a disadvantage that the construction of the signal reader is complicated or that control by a microcomputer needs complicated programs. The latter method is also disadvantageous in that control cannot be precisely effected.

SUMMARY OF THE INVENTION

It is therefore a main object of the present invention to provide a method for detecting the ignition timing for a Diesel engine in which the ignition timing of the engine can be accurately detected without the necessity of frequency-dividing and counting the pulse signals from the crank angle sensor.

It is another object of the present invention to provide a method for detecting the ignition timing for a Diesel engine in which one crank angle signal has only to be produced at least for every one rotation of the crank shaft so as to enable the structure of the crank angle sensor to be simplified and the manufacturing cost thereof to be reduced, which leads to the total reduction of the costs.

It is another object of the present invention to provide a method for detecting the ignition timing for a Diesel engine in which the crank angle signal is produced in the vicinity of a top dead point and out of a predetermined crank angle range where no ignition signal is produced so that the time interval between the crank angle signal and the ignition signal is small.

It is further object of the present invention to provide a method for detecting the ignition timing for a Diesel engine in which the influence of the engine speed variation including the angular speed variation can be minimized.

It is still another object of the present invention to provide a method for detecting the ignition timing for a Diesel engine in which the ignition timing of the engine can be securely detected with a sufficiently high precision.

It is still further object of the present invention to provide an apparatus for detecting the ignition timing for a Diesel engine in which above-mentioned drawbacks of the prior-art technique by providing the Diesel engine ignition timing detector which is so arranged as to take, when plural combustion light or flame are detected from more than one combustion in a single combustion stroke, only the first combustion light or flame and to disregard the other lights or burning flames, thereby detecting an accurate ignition timing even when such plural combustions are done in one stroke of combustion, and providing an accurate ignition timing detection signal to the fuel injection timing and amount controllers.

It is still another object of the present invention to provide an apparatus for detecting the ignition timing for the engine in which even when the flame sensor detects the burning flame or combustion light more than twice per one combustion stroke, the first combustion light is always detected so that an accurate fuel injection start timing can be detected.

It is still another object of the present invention to provide an apparatus for detecting the ignition timing for the engine in which a microprocessor or microcomputer is used without the necessity of a complicated construction of the ignition timing detector according to the prior art and also without the complicated control programs for the accurate ignition timing detection.

One of the features of the present invention resides in the method for detecting the ignition timing of a Diesel engine from a crank angle signal developed at a predetermined crank angle position of the Diesel engine and an ignition signal from an ignition sensor which detects the ignition within the combustion chamber of the engine, comprising the steps of determining a time interval between the crank angle signal and the ignition signal from a time point when the crank angle signal has been developed out of a crank angle range nearly before and after the top dead center of the crank and where at least the ignition occurs, and a time point when said ignition signal has developed, and detecting, as a crank angle position, an ignition timing according to these two time intervals.

Another feature of the present invention resides in an apparatus for detecting the ignition timing for the engine which comprises flame detecting means for detecting a burning flame or flames of fuel, photoelectric converting means for converting the burning flame or flames detected by said flame detecting means into an electric signal or signals, wave shaping means for shaping the waveform of the signal produced from the photoelectric converting means, and signal storing means for storing signals and data and which is set by the output signal from said shaping means on one hand and reset by a crank angle signal in synchronization with the rotation of a crank shaft, on the other hand.

These and other objects, features and advantages of the present invention will be better understood from the ensuing description made of the embodiments, by way of example, of the present invention with reference to the accompanying drawings.

DESCRIPTION OF THE PREFERRED EMBODIMENT

Figure 1:
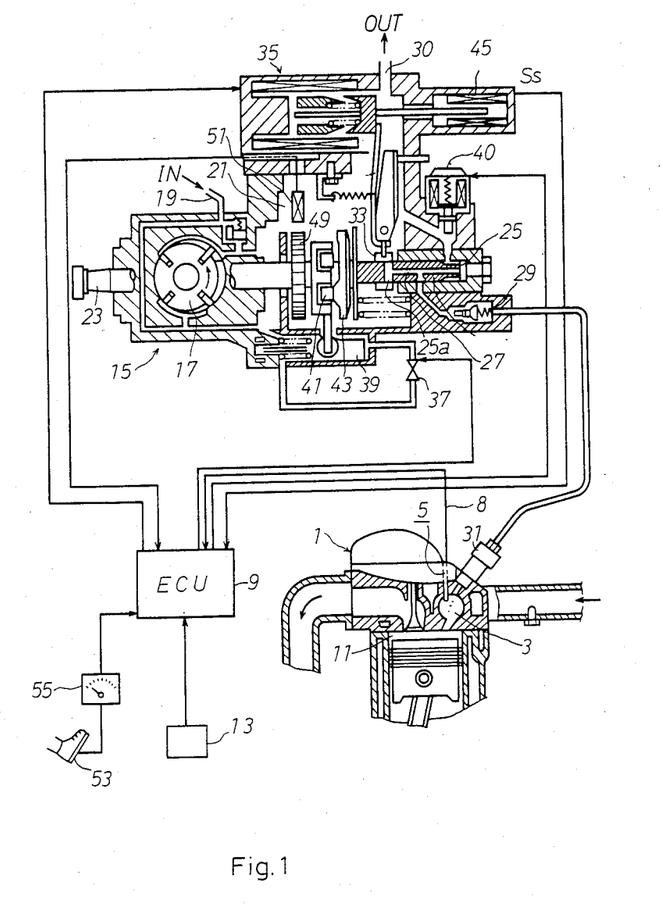
FIG. 1 illustrates an example of a Diesel engine system to which the method according to the present invention is applied.

Referring now to FIG. 1, there is illustrated one example of a construction of the Diesel engine system to which the present invention is applied. A Diesel engine body 1 has a subcombustion chamber 3 in which the end of an ignition sensor or a burning flame sensor 5 shown in FIG. 2 projects as exposed. In the present embodiment, the ignition or flame sensor 5 has integrally incorporated therein a glow plug 5a. The flame sensor 5 is connected via an optical fiber 8 to an electronic control unit 9 so that the light from the combustion or burning flame within the combustion chamber 11 is guided to the electronic control unit 9.

The reference numeral 13 denotes a crank angle sensor which is disposed so as to produce a crank angle signal at a crank angle position out of ignition timing in the combustion chamber 11, that is, at 20° before top dead center. The sensor 13 is also connected to the control unit 9 so as to supply the crank angle signal to the circuit.

On the other hand, the numeral 15 indicates a fuel injection pump according to the prior art. The fuel under a low pressure led from an inlet port 19 by a fuel pump 17 is fed to a low-pressure chamber 21, and further led into a high-pressure chamber 21, and further led into a high-pressure chamber 27 by a plunger 25 which reciprocally slides as rotated synchronously with the rotation of a shaft 23. The fuel is highly pressurized in the high-pressure chamber 27, delivered through a delivery valve 29 and injected from an injection valve 31 provided in each cylinder into the combustion chamber 11 of the cylinder. Excessive fuel is exhausted from an outlet port 30.

A fuel amount to be injected is determined depending on a positional relation between the right end face of a spill ring 33 and an outlet 25a in the plunger 25 an which is set by having the spill ring 33 slid by means of a linear solenoid 35, said spill ring being slidably fitted on the circumferential face of the plunger 25. On the other hand, the injection timing is controlled by controlling the pressure in a timer 39 by opening and closing intermittently an electromagnetic valve 37 as a timing control valve to appropriately set the positional relation between a roller 41 and a cam plate 43, thereby controlling the start timing of shifting the plunger 25 rightward.

The position of the linear solenoid 35, and consequently, of the spill ring 33, is detected by a spill position sensor 45, while the position of timer piston is detected by a timer position sensor 47. The engine speed is detected by a speed sensor 51 disposed opposite to a gear 49 rigidly fixed to the shaft 23 and which produces a pulse signal in accordance with a speed of the gear 49. Further, the depression of an accelerator pedal 53 is detected by an accelerator position sensor 55.

These sensors and the above-mentioned ones are connected to the control unit 9 which, receiving a signal from each of the sensors, will calculate a fuel injection amount and timing. A control signal resulted from the calculation is supplied to the linear solenoid 35 and an electromagnetic valve 37. The reference numeral 40 denotes a solenoid for cutting the supply of fuel.

Figure 2:
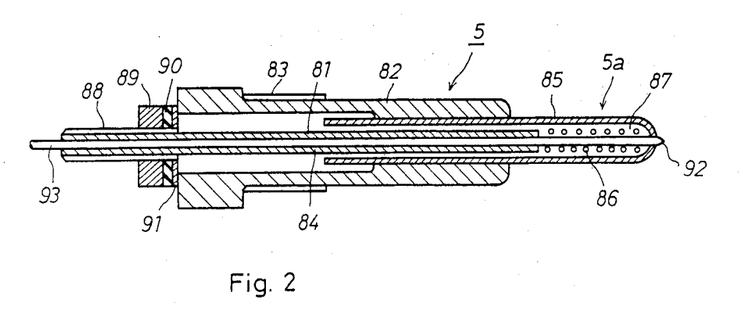
FIG. 2 illustrates an axial sectional view of a flame sensor to be used in the present invention.

FIG. 2 shows a detailed construction of the ignition or the flame sensor. The flame sensor 5 is formed integrally with a glow in a crank angle range outside of the range where ignition can occur nearly along the axial center of glow plug 5a. The glow plug 5a is well known. A housing 82 is so designed as to be attachable at a threaded portion 83 thereof to the cylinder head (not shown) of the engine. The housing has disposed inside thereof a central electrode 84 and a heat-resistance metallic tube 85, between which an exothermic or heat coil 86 is electrically connected. The exothermic coil 86 is insulated and supplied by powder 87 which is an insulating material filled in the tube 85, and a central electrode 84 is connected to the non-grounded side of the power source under the action of a nut 89 fitted on a threaded portion 88 of the central electrode 84. When the housing 82 is attached on the cylinder head of the engine, the cylinder head is connected to the earthed side of the power source so that the exothermic coil 86 will be energized. A reference numeral 90 indicates an insulating seal and 91 denotes a washer.

The photoconductive member 81 is made of, for example, quartz optical fiber, and disposed through the central electrode 84 along the axis thereof and in the center of the coil turn of the exothermic coil 86 along the axis thereof. An end 92 of the photoconductive member 81 is so laid as to penetrate through the end of the tube 85 facing the engine combustion chamber in order to collect the combustion lights or flames. Also, a photoconductive portion 93 of the photoconductive member 81 is connected to the photoelectric converter circuit 60 (in FIG. 4) where the lights collected by the end 92 are converted into an electric ignition signal.

Figure 3:
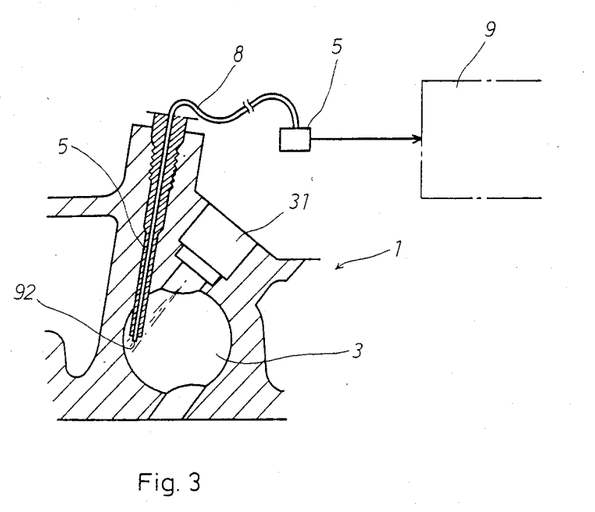
FIG. 3 illustrates a partially enlarged view of the structure around the engine in FIG. 1 in which the flame sensor shown in FIG. 2 is mounted.

FIG. 3 shows an enlarged view of the positional relationship among the engine 1, the combustion chamber 3, the flame sensor 5, the optical fiber 8, the nozzle 31 and the detection end 92 of the flame sensor 5 shown in FIGS. 1 and 2.

Figure 4:
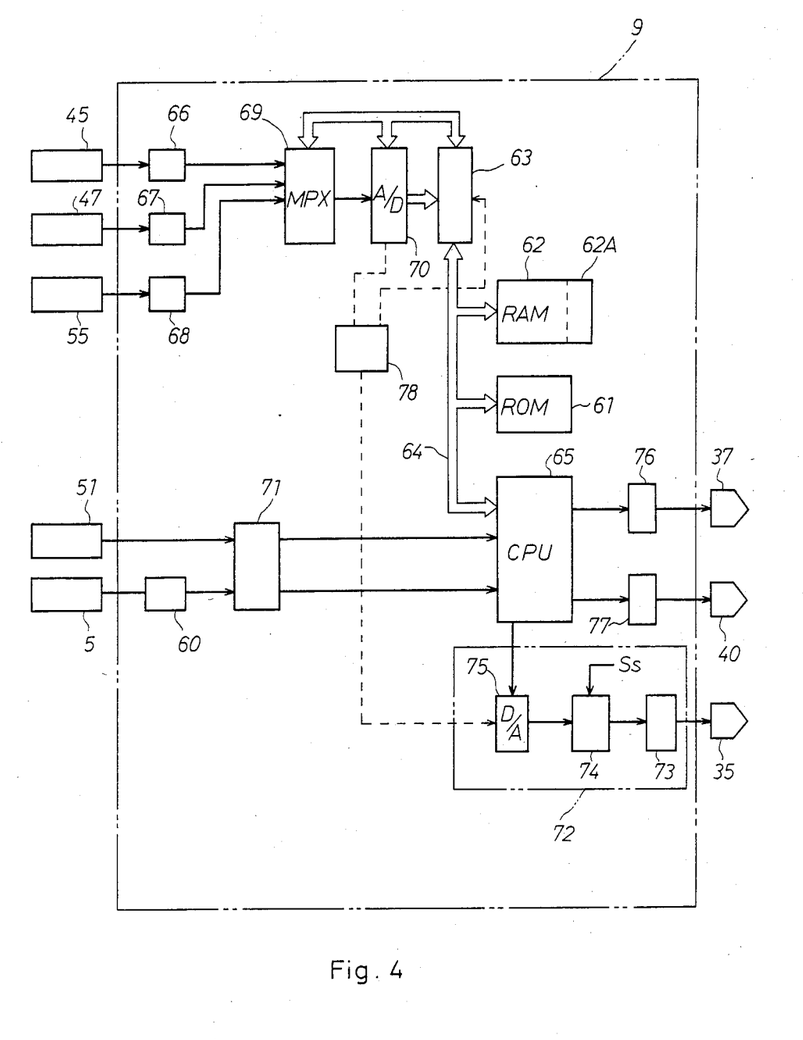
FIG. 4 illustrates a detailed circuit construction of the electronic control unit shown in FIG. 1, FIGS. 5 through 7 illustrate respectively program and operational flow charts of the operations for realizing the method according to the present invention.

FIG. 4 shows a detailed circuit construction of the control unit 9 in FIG. 1. Referring to FIG. 4, a read only memory (ROM) 61 where processing programs for the execution of various processings or operations and monitor programs have been stored, a random access memory (RAM) 62 which temporarily stores the calculation contents and sensor output contents and which are provided with a backup memory 62A which keeps storing the calculation contents and settings even at time of a power failure, and an input/output circuit 63 are connected to a central processing unit (CPU) 65 by means of a bus line 64, which form together a microcomputer or microprocessor.

Analogue signals from the spill position sensor 45, timer position sensor 47 and accelerator position sensor 55 are supplied through buffers 66, 67 and 68, respectively to a multiplexer (MPX) 69 where any one of the signals is selected as desired. Connected to MPX 69 is an analogue-digital converter (A/D converter) 70 which converts the analogue signal from MPX 69 into a digital signal which will be supplied to the input/output circuit 63. Speed signal from the engine speed sensor 51 and the ignition signal produced through the photoelectric conversion by a photoelectric converter 60 of a combustion light detected by the ignition sensor or flame sensor 5, are supplied to CPU 65 via a wave shaping circuit 71.

CPU 65 supplies an injection amount control actuator drive circuit 72 with a control signal to control the fuel injection pump 15. The actuator drive circuit 72 is composed of a drive circuit 73 which drives the linear solenoid 35, a servo amplifier 74 to supply said drive circuit 73 with a drive signal, and a digital-analogue (D/A) converter 75 which converts the digital signal from the CPU 65 to an analogue signal which will be supplied to the servo amplifier 74. The servo amplifier 74 produces a drive signal according to an analogue signal Ss from the spill position sensor 45 and analogue signal from the D/A converter 75. Also, to CPU 65 there is connected drive circuits 76 and 77 to which the timing control valve 37 and fuel cutting solenoid valve 40 are connected, respectively. The reference numeral 78 denotes a clock generator.

The method of detecting Diesel-engine ignition timing, having been described in the foregoing, will be described with reference to FIGS. 5 through 8.

Figure 5:
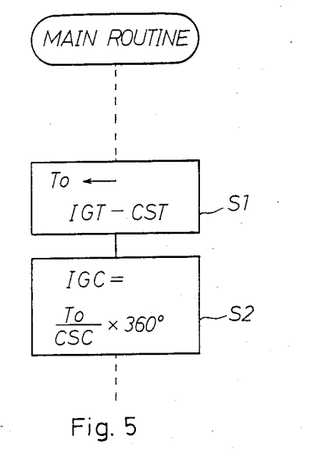

FIG. 5 shows a part of a main routine of a control program. In the step S1, a time interval to between the time IGT when combustion lights are detected by the ignition sensor 5 and the time CST when a crank angle signal is produced from the crank angle sensor 13. The time interval T0 is divided by the development cycle CSC of the immediately preceding crank angle signal. The result of this division is multiplied by 360 degrees to determine a crank angle displacement IGC from the development of the crank angle signal until that of the ignition signal (See FIG. 8).

Figure 6:
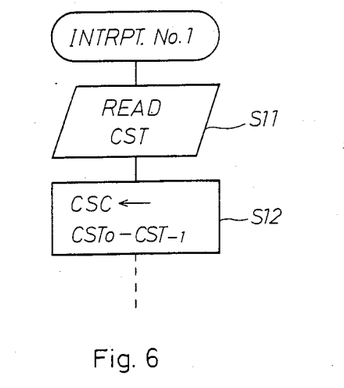

The cycle CSC of crank angle signal is determined as shown in FIG. 6. That is, the routine shown in FIG. 6 is an interrupt routine by which a time interrupted by the procedure S11, namely, the time CST0 when the crank angle signal is developed, is read, an by the procedure S12, a time interval between the precedent interrupt time CST-1 and the present interrupt time CST0, that is, the latest cycle CSC of crank angle signal, is determined and stored in a predetermined memory area.

Figure 7:
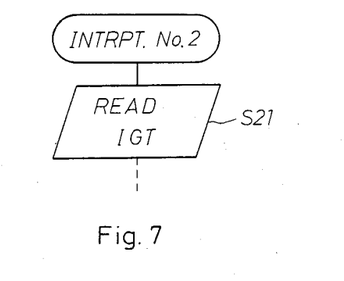
Figure 8:
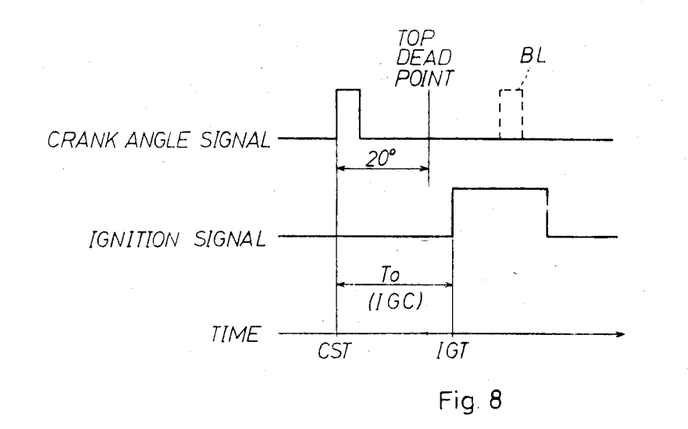
FIG. 8 illustrates a timing chart showing the crank angle signal, ignition signal and the time elapsed.

Also, the ignition time, namely, a time when the ignition signal is produced, is determined by the interrupt routine shown in FIG. 7. Particularly, when an ignition signal is produced, this program is interrupted and initiated. By this procedure S21, the interrupt time, in other words, an ignition time IGT, is read and stored in the predetermined memory area.

As having been described in the foregoing, with the embodiment according to the present invention, a crank angle signal is produced at a crank angle position of 20° before the top dead center, and a time interval T0 between the time CST when the crank angle signal is produced and the time when the combustion light signal from the ignition sensor 5 is converted into an ignition signal by the photoelectric converter circuit 60, while the time interval is converted into a crank angle displacement by the latest crank angle cycle, for thereby detecting an accurate ignition timing.

Accordingly, the crank angle to be used in the present invention sensor may be such that a single crank angle signal is produced while the crank angle changes through 360 degrees. In other words, no expensive sensor is required in the present invention to produce a crank angle signal at each of relatively small crank angle displacement, for example, at every one degree of such displacement. Further, it is not necessary to frequency-divide the crank angle signal, so that no processing circuit for such signals is necessary.

Figures 9, 10:
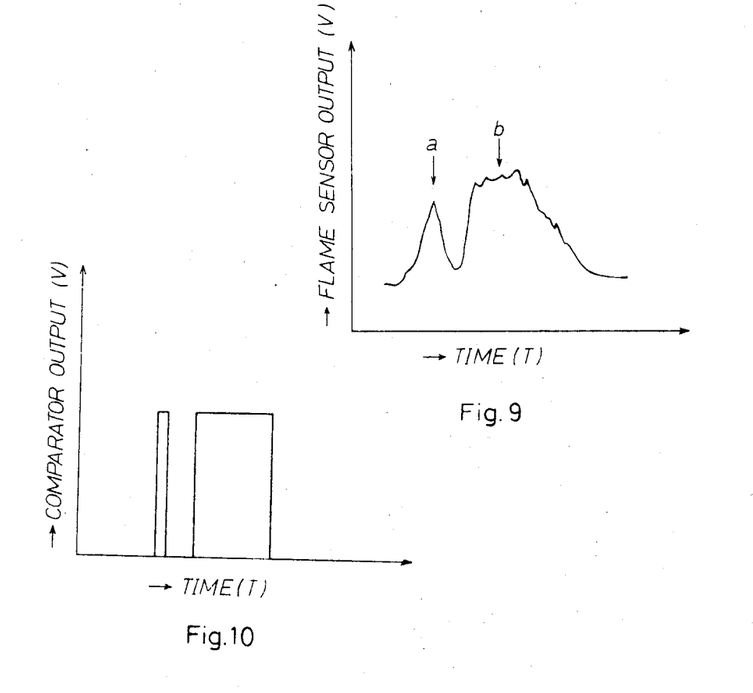
FIG. 9 illustrates a graph showing a waveform of a signal produced from the flame sensor according to the prior art.
FIG. 10 illustrates an output signal from a comparator after shaping the waveform shown in FIG. 9.

Now, turning back to FIG. 3, the combustion light or the burning flame detected by the flame sensor 5 is led out of the combustion chamber through the optical fiber 8 and is converted into an electrical signal, by the photoelectric converting means such as photodiode, phototransistor or solar cell. However, the fuel is not necessarily combusted at a time after the ignition is started. Namely, there is a case that one injection of the fuel is followed by two combustion strokes (this number of the combustions is greater in some cases, as shown by the marks a and b in FIG. 9. In this case, the output signal from the flame sensor 5 shown in FIG. 9 is shaped by a comparator as shaping means. A shown in FIG. 10, after the shaping two detection signals are produced by one combustion stroke. Accordingly, the control of the fuel injection timing and amount in accordance with the detection signals could not be precisely carried out in the technique according to the prior art. As described in the foregoing, in order to overcome this shortcoming a system has been proposed in which when plural signals are supplied as an input to the system at short intervals, the plural signals are interpreted as one signal if the time interval between such plural signals is judged to be less than a perdetermined interval. In the prior art, however, the time interval between the detected plural signals which may be taken as one signal varies with the change in the engine speed, with the disadvantage that the construction of the signal detector became complicated. The apparatus for detecting the ignition timing for the engine, according to the present invention has overcome the above problems.

Figure 11:
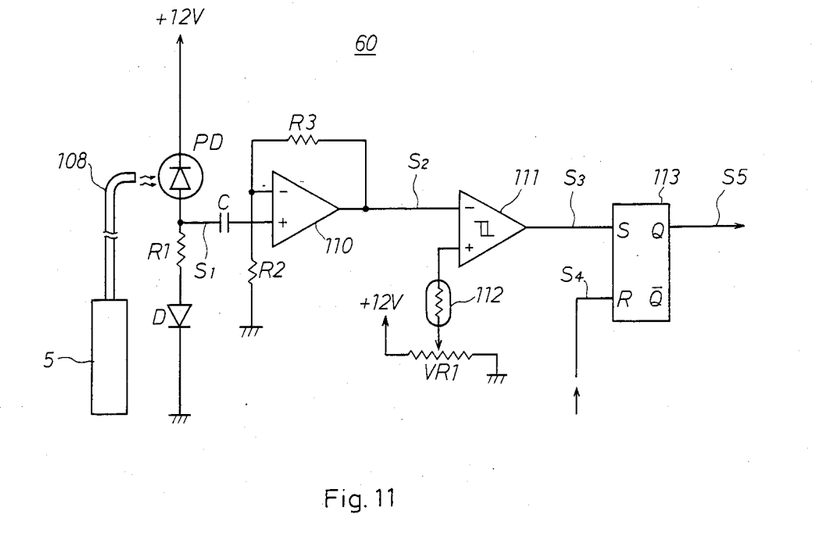
FIG. 11 illustrates a detailed circuit diagram of the detecting apparatus for the ignition timing according to the present invention, and FIG. 12 including parts a-e, illustrates a process of how the accurate detection signal is obtainable according to the detecting apparatus, according to the present invention, after the detection of the flame by the flame sensor in FIG. 2.
Figure 12A:
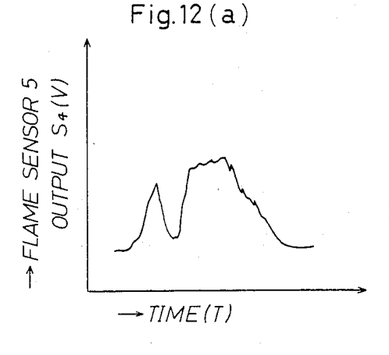
Figure 12B:
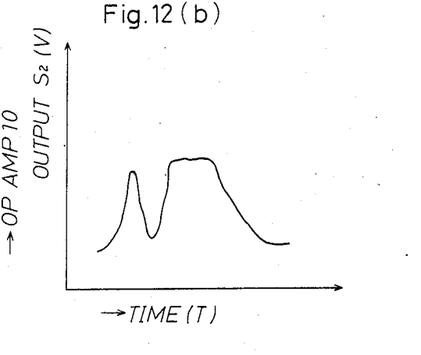
Figure 12C:
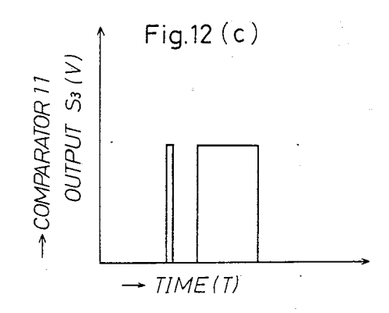
Figure 12D:
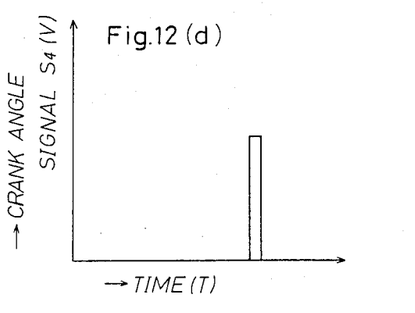
Figure 12E:
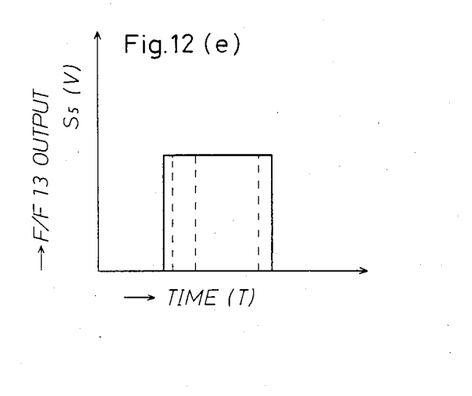

FIG. 11 shows one embodiment of the photoelectric converter circuit 60 according to the present invention shown in FIG. 4. In the photoelectric converter circuit according to the present invention, the light from fuel combustion or burning flame detected by a flame sensor 5 is led by the optical fiber 108 to a photodiode PD. This photodiode PD is applied at the cathode thereof with a positive voltage, and has the anode grounded through a resistor R1 and diode D connected in series. A voltage signal from the junction (common connection) between the photodiode PD and resistor R1 is applied as input to the non-inverted input terminal of an operational amplifier 110, as a voltage amplifier via a capacitor C. The voltage amplifier 110 has an output connected to the inverted input terminal of the same amplifier 110 via a feedback resistor R3, and the inverted input terminal is grounded via a gain setting resistor R2. Therefore, a detection signal photoelectrically converted by the photodiode PD in response to the intensity of the combustion light is amplified by the voltage amplifier 110 with a predetermined gain.

The voltage amplifier 110 has another output connected to the inverted input terminal of an operational amplifier 111, as a comparator, which is supplied at the non-inverted input terminal thereof with a reference voltage set by a potentiometer VR1 and temperature-compensated by a thermister 112, as input.

The output from the comparator 111 is connected to the set terminal S of a R-S flip-flop circuit 113, as signal storage means, which is also supplied at the reset terminal R thereof with a crank angle signal at every crank angle position (CA) of 720° in synchronism with the rotation of a crank shaft (not shown). Therefore, with the rise of the signal output from the comparator 111, the output Q of the R-S flip-flop has a high level and keeps the high level independently of how many times pulse signal is subsequently supplied as input. The output Q will take the low level only when a crank angle signal is supplied to the reset terminal R.

A crank angle signal is supplied to the reset terminal R once per two rotations of the engine, namely, per CA of 720° so that the first combustion light in one combustion stroke can be accurately detected.

It should be noted that in FIG. 11, R1 is a resistor of 1 MΩ, R2 is a resistor of 50 Ω, and R3 is a resistor of 50 kΩ, and C is a capacitor of 10 μF.

The detecting unit according to the present invention operates as follows. The explanation will be done with reference to the graphs in FIG. 12. FIG. 12 (a) shows a signal S1 produced at the junction between R1 and photodiode PD. The voltage signal from the photodiode PD is amplified as shown in FIG. 12 (b) by the voltage amplifier 110. The amplified voltage signal S2 is shaped as shown in FIG. 12 (c) by the comparator 111 and the shaped signal S3 is supplied as input to the set terminal S of the R-S flip-flop circuit 113 which will also be supplied at the reset terminal R thereof with a reset signal S4 as shown in FIG. 12 (d) at each CA of 720° according to the crank angle signal. Thus, the output signal shown in FIG. 12 (e), S5 from the R-S flip-flop circuit 113 will be provided as one signal even if the output from the comparator 111 is as indicated with the dotted lines.

In the foregoing embodiment according to the present invention, the temperature-compensating thermister 112 is connected to the non-inverted input terminal of the comparator 111. This thermister 112 is provided for preventing the conditions from occurring, i.e. any change of the reference voltage for waveform shaping due to the temperature causes the threshold level to change and accurate ignition timing can no longer be detected. According to another embodiment of the present invention, the comparator 111 and voltage amplifier 110 may be connected by means of a capacitor, instead of providing the thermister 112, so as to cut the dark current.

With the construction of the embodiment described in the foregoing, even when the flame sensor 5 detects the light or the burning flame more than twice per one combustion stroke, the first combustion light or flame can be always detected so that an accurate fuel injection start timing can be detected, thereby permitting an accurate detection signal to be applied to the electronic control unit 9 for controlling the fuel injection amount and timing. Also, since the circuit construction is very simple, it is not necessary to provide an apparatus with a complicated construction for detecting the accurate timing or to prepare complicated control programs for the accurate ignition timing detection.

As described in the foregoing, the ignition timing detecting unit for a Diesel engine according to the present invention is so arranged that a combustion flame or flames detected by the flame sensor are photo-electrically converted into an electrical signal or signals which, after shaping, is applied to the set terminal of a R-S flip-flop circuit, as signal storage means, while resetting the reset terminal of the R-S flip-flop with a crank angle signal.

Thus, even when combustion light is detected twice for one combustion stroke, an accurate ignition timing can be detected by always detecting only the first combustion light. Also, the simplified circuit construction permits the manufacturing costs to be reduced, while alleviating the reliance to control programs for a control system.

Furthermore, the accurate ignition timing detection provides for a precise control, resulting in an improvement of fuel cost, emission, etc.

As described in the foregoing, according to the present invention, a crank angle signal can be produced at least for every one revolution of the crank shaft in the vicinity of the top dead point and out of a predetermined crank angle range where no ignition signal is produced, which enables the construction of the crank angle sensor to be simplified.

While the invention has been described in its preferred embodiments, it is to be understood that the words which have been used are words of description rather than of limitation and that various changes and modifications may be made within the purview of the appended claims without departing from the spirit and true scope of the invention in its broader aspects.

What is claimed is:

1. An apparatus for detecting the ignition timing of a Diesel engine which comprises;
   (a) flame detecting means for detecting a burning flame or combustion light of fuel;
   (b) photoelectric converting means for converting said combustion light detected by said flame detecting means into an electrical signal;
   (c) wave shaping means for shaping the waveform of said signal produced from said photoelectric converting means; and
   (d) signal storing means for storing signals and which is set by the output signal from said wave shaping means on one hand, and reset by a crank angle signal synchronous with the rotation of a crank shaft on the other hand.

2. An apparatus for detecting the ignition timing of a Diesel engine as set forth in claim 1 wherein said crank angle signal is applied to a reset terminal of said signal storing means, once for every two revolutions of the engine at the crank angle of 720 degrees.

3. Apparatus as recited in claim 1 which comprises a microprocessor having a RAM and a ROM.

4. A system for detecting the ignition timing for control of a Diesel engine during vehicle operation comprising:
   (a) means for detecting crank angles and for generating a crank angle signal indicative of crank angle, said crank angle signal being generated at a predetermined crank angle position near top dead center and outside of the crank angle range where ignition occurs;
   (b) means for detecting the ignition timing for a Diesel engine and for generating a combustion light signal indicative of luminous intensity in a combustion;
   (c) means for shaping waveforms, said means generating a first signal comprising a shaped waveform of said crank angle signal, said first signal being generated near 20° crank angle prior to the top dead center, and a second signal comprising a shaped waveform of said combustion light signal; and
   (d) control means for detecting generated times of said first signal and said second signal, for calculating the time interval between said first and second signals, and for converting said time interval into a crank angle.

5. A system for detecting the ignition timing for an electrically controlled Diesel engine comprising:
   means for detecting crank angles, said means generating a crank angle signal indicative of a predetermined crank angle of the engine,
   means for detecting combustion light of the engine, said means generating a combustion light signal indicative of luminous intensity in a combustion chamber,
   means for shaping waveforms, said means generating a first signal comprising a shaped waveform of said crank angle signal and a second signal comprising a shaped waveform of said combustion light signal, and
   control means for generating a control signal which is set upon generation of said second signal and which is reset upon generation of said first signal.

6. A system as set forth in claim 5, wherein said control means comprises a flip-flop circuit having set and reset terminals and receiving said second and first signals from said means for shaping waveforms thereof, respectively.

7. A system for detecting the ignition timing for a Diesel engine as set forth in claim 5, wherein said crank angle signal is generated twice every 720° of crank rotation.

8. A system as set forth in claim 5, wherein said control means comprises a micro-processor having a CPU, a RAM, a ROM.

9. A system as set forth in claim 5, wherein said first signal is generated near 20° crank angle prior to the top dead center position.

10. A method for detecting ignition timing by detecting generation of combustion light for an electronically controlled Diesel engine comprising the steps of:
    generating a crank angle signal indicative of a predetermined crank angle of the engine,
    generating a combustion light signal indicative of luminous intensity in a combustion chamber,
    shaping the waveform of said crank angle signal to generate a first signal,
    shaping the waveform of said combustion light signal to generate a second signal;
    generating a control signal which is set upon generation of said second signal and which is reset upon generation of said first signal; and
    calculating ignition timing from said crank angle signal and said control signal.

* * * * *